United States Patent [19]

Prejean

[11] Patent Number: 5,350,803
[45] Date of Patent: Sep. 27, 1994

[54] MOISTURE-CURABLE MELT-PROCESSIBLE ETHYLENE COPOLYMER ADHESIVES

[75] Inventor: George W. Prejean, Orange, Tex.

[73] Assignee: E. I. Du Pont de Nemours and Company, Wilmington, Del.

[21] Appl. No.: 40,811

[22] Filed: Mar. 31, 1993

Related U.S. Application Data

[63] Continuation-in-part of Ser. No. 796,508, Nov. 22, 1991, Pat. No. 5,210,150.

[51] Int. Cl.$^5$ ................................. C08F 8/42
[52] U.S. Cl. ..................... 525/100; 525/103
[58] Field of Search .................. 525/100, 103, 106

[56] References Cited

U.S. PATENT DOCUMENTS

| | | | |
|---|---|---|---|
| 3,408,420 | 10/1968 | Wiggill | 525/342 |
| 3,644,245 | 2/1972 | Flanagan et al. | 525/100 |
| 3,780,140 | 12/1973 | Hammer | 525/185 |
| 4,032,487 | 6/1977 | Columbus | 525/103 |
| 4,144,202 | 3/1979 | Ashcraft et al. | 525/100 |
| 4,338,227 | 7/1982 | Ballard | 524/147 |
| 4,351,931 | 9/1982 | Armitage | 520/227 |
| 4,549,041 | 10/1985 | Shingo et al. | 428/391 |
| 5,210,150 | 5/1993 | Prejean | 525/329.7 |

FOREIGN PATENT DOCUMENTS 62-187749  8/1987  Japan ................................. 825/100

*Primary Examiner*—Ralph H. Dean
*Attorney, Agent, or Firm*—Peter A. Fowell

[57] ABSTRACT

Moisture-curable melt-processible adhesives are obtained by reacting certain ethylene copolymers containing an alkyl acrylate and a carefully limited amount of a carboxylic acid with a stoichiometric amount of an epoxy-silane. A process of preparing the moisture-curable melt-processible adhesives in the absence of solvent is also available.

9 Claims, No Drawings

MOISTURE-CURABLE MELT-PROCESSIBLE ETHYLENE COPOLYMER ADHESIVES

CROSS REFERENCE TO RELATED APPLICATION

This Application is a continuation-in-part of pending U.S. application Ser. No. 07/796,508, filed Nov. 22, 1991, now U.S. Pat. No. 5,210,150.

BACKGROUND OF THE INVENTION

1. Field of the Invention

This invention relates to moisture-curable ethylene copolymer compositions useful as hot-melt adhesives, and more particularly it relates to such compositions containing hydrolysable silane groups. The moisture-curable copolymers are prepared from defined ethylene copolymers containing a specified level of carboxylic functionality, by reaction with epoxy-silanes.

2. Description of Related Art

Use of adhesives applied as a hot melt is growing rapidly because hot melts allow fast production speeds, and solvents are unnecessary. Use of solvents is increasingly regarded as undesirable. However, for many applications limited temperature resistance of hot-melt adhesives is a major deficiency. Often, a 'soft' adhesive which maintains an adhesive bond well at ambient temperatures becomes weak at higher temperatures, and is not suitable for use at such temperatures.

Ethylene copolymers are well known for use as inexpensive hot-melt adhesives. Comonomers such as vinyl acetate or alkyl acrylates improve adhesive qualities over polyethylene alone partly because of their polar nature. Alkyl acrylates however are known to provide more stable ethylene copolymers than vinyl acetate. The higher n-alkyl acrylates, which produce low glass transition temperature, also produce lower glass transition temperature ethylene copolymers. This contributes to 'softness' of the adhesive, imparting greater adhesivity, particularly at lower temperatures. Highly polar acidic monomers such as acrylic and methacrylic acid are also known to be excellent comonomers for ethylene copolymer adhesives.

Reduction in crystallinity resulting from copolymerization also imparts adhesivity. In ethylene copolymers, both lower crystallinity and lower glass transition temperature result in 'softer' more adhesive polymers at ambient and low temperatures. However there will also be a tendency to creep more. Such ethylene copolymers exemplify the statement above, that 'soft' adhesives become weak at high temperature, and are less effective adhesives at higher temperatures.

Various means have been used to counter this tendency. One means is use of block copolymers or graft copolymers with a soft and a hard segment. The segments are blocks or grafts consisting of a moderate to long polymeric sequence. Another approach is to crosslink the adhesive after it has been applied as a hot melt, by such means as radiation or chemical post-reaction techniques. Such techniques have long been known to reduce creep and improve other properties, particularly in wire coating uses.

Post-reaction crosslinking or 'curing' by radiation has many disadvantages with respect to equipment and other limitations. Post-reaction by purely chemical means is an alternative. This might involve any number of chemical reactions, but one of great convenience is 'silane' crosslinking. Here, moisture is allowed to hydrolyse certain silane groups leading to crosslinking.

To achieve silane crosslinking in ethylene copolymers it is necessary to incorporate a silane group in the copolymer. Ethylene copolymers containing silane groups are known, and have been prepared by at least three techniques. One is to copolymerize ethylene with vinyl silanes. Another is to graft vinyl silanes onto polyethylene or direct ethylene copolymers using peroxides or other free-radical initiators. Moisture-curable vinyl silane grafted polyolefins suitable for crosslinked wire and cable coatings are described in U.S. Pat. No. 4,549,041 (Shingo). This reference also discusses the advantages and disadvantages of silane crosslinking. One of the disadvantages of free radical vinyl silane grafting is the control of silane level, and the ability to obtain adequate silane levels.

A third known method of incorporating silane functionality is by another type of graft reaction. In this method, a direct copolymer containing a suitable reactive group is reacted with a silane containing compound which also contains a complementary reactive group to that in the direct copolymer. The result is a graft copolymer containing a reactive silane group. Here the graft is a simple reactive unit, not to be confused with the above mentioned graft copolymer containing a polymeric unit grafted on, where the graft unit itself is designed to increase high temperature properties.

Preparation of silane functional ethylene copolymers by this third method is described in U.S. Pat. No. 3,408,420 (Wiggill). This reference describes reaction of a wide range of ethylene copolymers containing a hydroxyl, carboxylic or acid chloride group with silane compounds containing a complementary reactive group such as a hydroxyl, secondary amino or epoxy group. The compounds are described as being useful as coatings on metal or glass and paper, and in the formation of fibers and films. In all cases preparation involved a solution of the reactive silane in an organic solvent. In addition, high levels of reactive monomer were present in the direct copolymer, and this results in an unstable polymer.

There is a need for an ethylene based silane containing polymeric composition which can both be prepared in the melt and be sufficiently melt stable to be used in the melt as an adhesive, and which can subsequently be crosslinked at an adequate rate and in a controllable way.

SUMMARY OF THE INVENTION

The present invention provides for melt-processible moisture-curable ethylene copolymer adhesives which contain a silane group. Moisture curing produces crosslinks which impart improved high temperature utility to the adhesive. In addition to adequate adhesivity there are two key requirements of the adhesive. The first that it should have a controlled level of grafting. This ensures the adhesive is sufficiently melt stable to be readily usable in the melt. The second is that it should be sufficiently low in crystallinity to allow easy moisture penetration to allow moisture cure.

According to the present invention there is provided a melt-processible, moisture-curable adhesive copolymer comprising the reaction product of (A) a direct copolymer from monomers comprising (i) ethylene, (ii) 1–5 wt. % based on the direct copolymer of an alpha,-beta-ethylenically unsaturated carboxylic acid selected from the group consisting of acrylic acid, methacrylic acid, maleic acid, half esters of maleic acid and itaconic acid, and (iii) 15-40 wt. % based on the direct copolymer of an alkyl acrylate or methacrylate selected from the group consisting of methyl acrylate, methyl methacrylate, ethyl acrylate and iso-butyl acrylate and (B) a substantially stoichiometric amount with respect to the amount of carboxylic acid, of an epoxy-silane, wherein the melt index of the resulting melt-processible moisture-curable adhesive copolymer is from 30 to 1500.

There is further provided a method of preparing the moisture-curable melt-processible copolymer by direct fabrication in the melt without solvent.

DETAILED DESCRIPTION OF THE INVENTION

In this disclosure, the word copolymer is meant to embrace polymers containing two or more than two monomers as well as the silane grafted copolymer composition of this invention. The phrase 'direct copolymer' means a copolymer made by copolymerization of monomers together, as distinct from grafting of a monomer onto a polymer backbone. The latter is known as a 'graft-copolymer'. The phrase graft copolymer has been used above also to describe copolymers grafted with a polymeric or oligomeric unit. The polymers of this invention are graft copolymers where the grafting has been carried out by reaction of a low molecular weight reactive compound with a direct copolymer.

The direct copolymer used in this invention contains an alpha,bet-carboxylic acid. It also contains 15-40 wt. % of an alkyl acrylate or methacrylate. N-alkyl acrylates with an alkyl group containing 4-8 carbon atoms are highly suitable as comonomers because of their ability to generate adhesivity particularly at low temperatures. This results from the low glass transition temperature caused by these monomers. However, other alkyl acrylates and methacrylates are also suitable, including methyl acrylate, or methacrylate, ethyl acrylate and iso-butyl acrylate. While they have a less pronounced effect on the glass transition temperatures of copolymers containing them, methyl and ethyl acrylate particularly, because of their lower molecular weight, are more effective than higher acrylates, in reducing crystallinity and are effective at as low as 15 weight percent level. As noted, low crystallinity is important in adhesion. All acrylates provide thermal stability in the resulting direct copolymers. Thermal stability allows the copolymer to be reacted at relatively high melt temperatures, and thus sufficiently rapidly, with an epoxy-silane. Below 15 weight %, insufficient softening is imparted to the copolymer. Above 40 wt. %, the polymer becomes overly soft, and is difficult to handle.

The comonomer necessary to produce the reactive group in the direct ethylene copolymer is an alpha,beta-unsaturated carboxylic acid. Suitable carboxylic acids include methacrylic acid, acrylic acid, itaconic acid, maleic acid, and half esters of maleic acid. Methacrylic acid and acrylic acid are preferred. The acid functionality does not remain in the polymer after grafting, since it is essentially reacted with a stoichiometric amount of epoxy groups in the epoxy-silane. While such monomers are excellent comonomers to provide adhesive qualities in ethylene copolymers, here, their function is solely to provide a reactive site. The other comonomer, the alkyl acrylate, is quite sufficient to provide adhesivity without excess acid comonomer remaining. In addition, excess acid comonomer is believed to crosslink the silane groups without the presence of moisture, leading to a polymer which would crosslink in the melt, rather than have a stable melt. The crosslinking is desired only after melt application, after cooling, by means of moisture.

The level of acid functionality in the direct copolymer appears to be critical. It is necessary for there to be sufficient to allow enough silane grafting for the resulting polymer to cure (crosslink) adequately. However, above a given level, the stability of the silane-grafted moisture-curable polymer suffers. While not limited to any particular theory, this is believed to be due to the fact that the reaction of the carboxylic group with the epoxy group is a ring opening reaction which leaves a secondary hydroxyl group. This group is capable of reacting with silane groups, particularly if any trace acid functionality remains which might catalyse such a condensation reaction. The result is a polymer which, without water, can crosslink merely with heat, and thus be less stable during melt processing, in a similar way to that which would occur if excess unreacted acid groups were present after grafting. The amount of the alpha,-beta-unsaturated carboxylic acid comonomer employed is thus limited to between 1 and 5 wt. % if the direct copolymer, preferably between 2-4 wt. %.

Preparation of these direct copolymers is achieved by well known methods, using a continuous stirred reactor at high temperatures and pressures such as in U.S. Pat. Nos. 4,351,931, and 3,780,140 which are hereby incorporated by reference. Feed rates of the monomers are adjusted to allow for their various reactivities.

The second component of the moisture-curable melt-processible copolymers is an epoxy-silane. By epoxy-silane is meant a low molecular weight compound which contains both an epoxy functionality and a silane functionality capable of crosslinking in the presence of moisture. Alkoxy-silane groups are suitable and the preferred group to provide reactive silane functionality.

While there are many known epoxy-silanes, only a few are relatively inexpensive and readily available. Two such compounds are glycidoxypropyl trimethoxysilane and beta-(3,4-epoxycyclohexyl)-ethyl trimethoxysilane, and these are preferred. Of these the former is most preferred.

The two components are reacted together in high-shear melt-mixing equipment, such as an extruder equipped with a suitable mixing screw, or other high shear mixers such as a Banbury or Haake mixer. Melt temperatures preferably between 140° and 200° C. are used to allow sufficiently rapid reaction. No solvent is used. Hold up times required for complete reaction are typically about 5 to 15 minutes depending on the temperature and shear of the equipment. Complete reaction may be ascertained by IR, using peaks of the acid functionality and of the epoxy functionality in the reacting compounds as a reference.

The moisture-curable (crosslinkable) melt-processible copolymers of this invention have a melt index of from 30 to 1500 to be suitable for use in hot-melt adhesive equipment. Melt indices of 200 to 1300 are preferred. Lower melt index materials may be processed by extrusion as extrusion-coated adhesives. The exact melt index needed will depend on the processing equipment and the particular end use. Generally speaking, the melt index of the direct copolymer and that of the silane-grafted final graft copolymer product are similar, the grafting reaction having a relatively small effect on the melt index.

The moisture-curable adhesive is suitable alone as an adhesive, but may also be formulated using art recognized modifiers such as plasticizers and tackifiers. Plasticizers are known to increase melt index when mixed with resin. High melt index resins may need little or no plasticizer, while low melt index resins may need some plasticizer. The use of plasticizers and tackifiers is well known in the adhesives industry, and extensive listings of such materials are given for instance in U.S. Pat. No.4,338,227, which is hereby incorporated by reference.

The moisture-curable adhesives have adequate initial strength as an adhesive before moisture cure, but on cure provide a high strength, high-heat resistant bond. In addition to adhesive use, these polymers could have utility as coatings, particularly for wire and cable use. They may also be foamed, and are suitable as in-place foamable adhesives.

In the following examples, the preparation of the moisture-curable ethylene copolymer is illustrated, as well as changes resulting when moisture cured. The examples are for copolymers containing n-butyl acrylate. Copolymers containing this and other n-alkyl acrylates are the subject matter of the related Application cross-referenced above. However, methyl acrylate, ethyl acrylate and iso-butyl acrylate as comonomers will give copolymers which behave in a generally similar way.

Melt Index is determined using ASTM D-1238 (2160 g/190° C). Tensile measurements, including Ultimate Strength (UT) Tensile Modulus and Elongation were measured using ASTM D 412-51T Viscosity Stability was measured using a Brookfield Viscometer, by measuring viscosity change with time at 150° C. and a shear rate of 0.1 sec$^{-1}$.

EXAMPLE 1

200 g. of a 1100 melt index ethylene/n-butyl acrylate/methacrylic acid copolymer containing 30 wt. % n-butyl acrylate, and 1.8 wt. % methacrylic acid was reacted with 10 g. of gamma-glycidoxypropyl trimethoxysilane in a Haake batch mixer at 150° C. for 15 minutes. Rotor speed was 50 rpm. Melt index of the final product (1075) was very close to the starting material.

The polymer was pressed into 75 mil (0075 in.) plaques and aged at 50 and 100% relative humidity (RH). Tensile properties were then measured. Results are shown in Table 1.

TABLE 1

Moisture cured Alkoxy-Silane containing Ethylene copolymer

| Time (Weeks) | 50% RH | | | 100% RH | | |
|---|---|---|---|---|---|---|
| | UT (psi) | % Elong. | Modulus (psi) | UT (psi) | % Elong. | Modulus (psi) |
| 0 | 278 | 180 | 1218 | 278 | 180 | 1218 |
| 1 | 302 | 267 | 1649 | 353 | 330 | 1992 |
| 2 | 331 | 276 | 1613 | 385 | 399 | 1919 |
| 3 | 336 | 298 | 1829 | 386 | 408 | 2145 |

TABLE 1A

Thermal Stability of Alkoxy-silane grafted Ethylene copolymer

| Time (hours) | Viscosity (cps) |
|---|---|
| 0 | 20M |
| 3 | 20M |
| 6 | 23.4M |
| 9 | 34M |
| 12 | 53M |

EXAMPLE 2.

200 g. of a 1100 melt index ethylene/n-butyl acrylate/methacrylic acid terpolymer containing 30 wt. % n-butyl acrylate and 1.8 wt. % of methacrylic acid was reacted with 10 g. of beta-(3,4-epoxycyclohexyl)-ethyl trimethoxysilane in a Haake batch mixer at 150° C. for 15 minutes. Rotor speed was 50 rpm. This represents a stoichiometric equivalent of carboxylic and epoxy groups. Melt index of the final product was essentially unchanged from the starting material and was 1060.

A two mil film was readily prepared in a melt press at 190° C. and a pressure of 1000 psi. The film was soaked in room temperature water for one week. An attempt to measure the melt index was then made. There was no measurable flow, showing the efficacy of the moisture curing reaction.

The same polymer was pressed into 75 mil plaques, using similar press conditions. The plaques were aged at 50% and 100% RH at room temperature for various times. Tensile property measurements show the efficacy of the moisture cure reaction and the advantage of higher relative humidity. Results are shown in Table 2.

TABLE 2

Moisture cure of Alkoxy-silane containing ethylene Copolymer

| Time | 50% RH | | | 100% RH | | |
|---|---|---|---|---|---|---|
| | UT (psi) | % Elong | Modulus (psi) | UT (psi) | % Elong | Modulus (psi) |
| 0 | 262 | 215 | 993 | 262 | 215 | 993 |
| 1 | 268 | 215 | 1237 | 320 | 307 | 1619 |
| 2 | 297 | 265 | 1240 | 363 | 377 | 1631 |
| 3 | 299 | 245 | 1456 | 361 | 365 | 1740 |

TABLE 2A

Thermal stability of Alkoxy-silane grafted Ethylene Copolymer

| Time (hr) | Viscosity (cps) |
|---|---|
| 0 | 29.6M |
| 0.5 | 63.4M |
| 1.0 | 70M |
| 1.5 | 162M |

The polymer used in both examples was the same. Results show that the silane used in Example 2 produces a resin which cured slightly less rapidly than the silane functionalized polymer of Example 1. In addition, as can be seen from Table 1A and Table 2A, the silane compound of Example 1 produces a product with superior thermal stability.

The measurements indicate that crosslinking is capable of doubling the tensile strength. At 100% RH a significant cure occurs even after one week.

I claim

1. A melt-processible moisture-curable copolymer comprising the reaction product of
   (A) a direct copolymer from monomers comprising
      (i) ethylene,
      (ii) 1–5 wt. % of the direct copolymer of an alpha,-beta-ethylenically unsaturated carboxylic acid selected from the group consisting of acrylic acid, methacrylic acid, maleic acid, half esters of maleic acid and itaconic acid, and
      (iii) 15–40 wt. % of the direct copolymer of an alkyl acrylate or methacrylate selected from the group consisting of methyl acrylate, methyl methacrylate, ethyl acrylate and iso-butyl acrylate, and
   (B) a substantially stoichiometric amount with respect to the amount of carboxylic acid, of an epoxy-silane, wherein the melt index of the melt-processible, moisture-curable copolymer is from 30 to 1500.

2. The moisture-curable melt-processible copolymer of claim 1 wherein the unsaturated carboxylic acid in the direct copolymer is methacrylic acid or acrylic acid and is present in an amount of from 2–4 wt. % in the direct copolymer.

3. The moisture-curable melt-processible copolymer of claim 2 wherein the epoxy-silane (B) is glycidoxypropyl trimethoxysilane or beta-(3,4-epoxycyclohexyl)-ethyl trimethoxysilane.

4. A moisture-curable melt-processible adhesive comprising the copolymer of claim 1, 2, or 3.

5. The moisture-curable melt-processible adhesive of claim 4 further comprising a plasticizer.

6. The moisture-curable melt-processible adhesive of claim 4, further comprising a tackifier.

7. The moisture-curable melt-processible adhesive of claim 5 further comprising a tackifier.

8. The moisture cured adhesive resulting from the moisture cure of the moisture-curable adhesive of claims 4.

9. The process of preparing a moisture-curable melt-processible copolymer comprising mixing in melt mixing equipment, in the absence of solvent, at a temperature of from 140° to 200° C.,
   (A) a direct copolymer from monomers comprising
      (i) ethylene,
      (ii) 1–5 wt. % of the direct copolymer of an alpha,-beta-ethylenically unsaturated carboxylic acid selected from the group consisting of acrylic acid, methacrylic acid, maleic acid, half esters of maleic acid and itaconic acid, and
      (iii) 15–40 wt. % of the direct copolymer of an alkyl acrylate or methacrylate selected from the group consisting of methyl acrylate, methyl methacrylate, ethyl acrylate and iso-butyl acrylate, and
   (B) a substantially stoichiometric amount with respect to the amount of carboxylic acid, of an epoxy-silane, wherein the melt index of the resultant melt-processible, moisture-curable copolymer is from 30 to 1500.

* * * * *